UNITED STATES PATENT OFFICE.

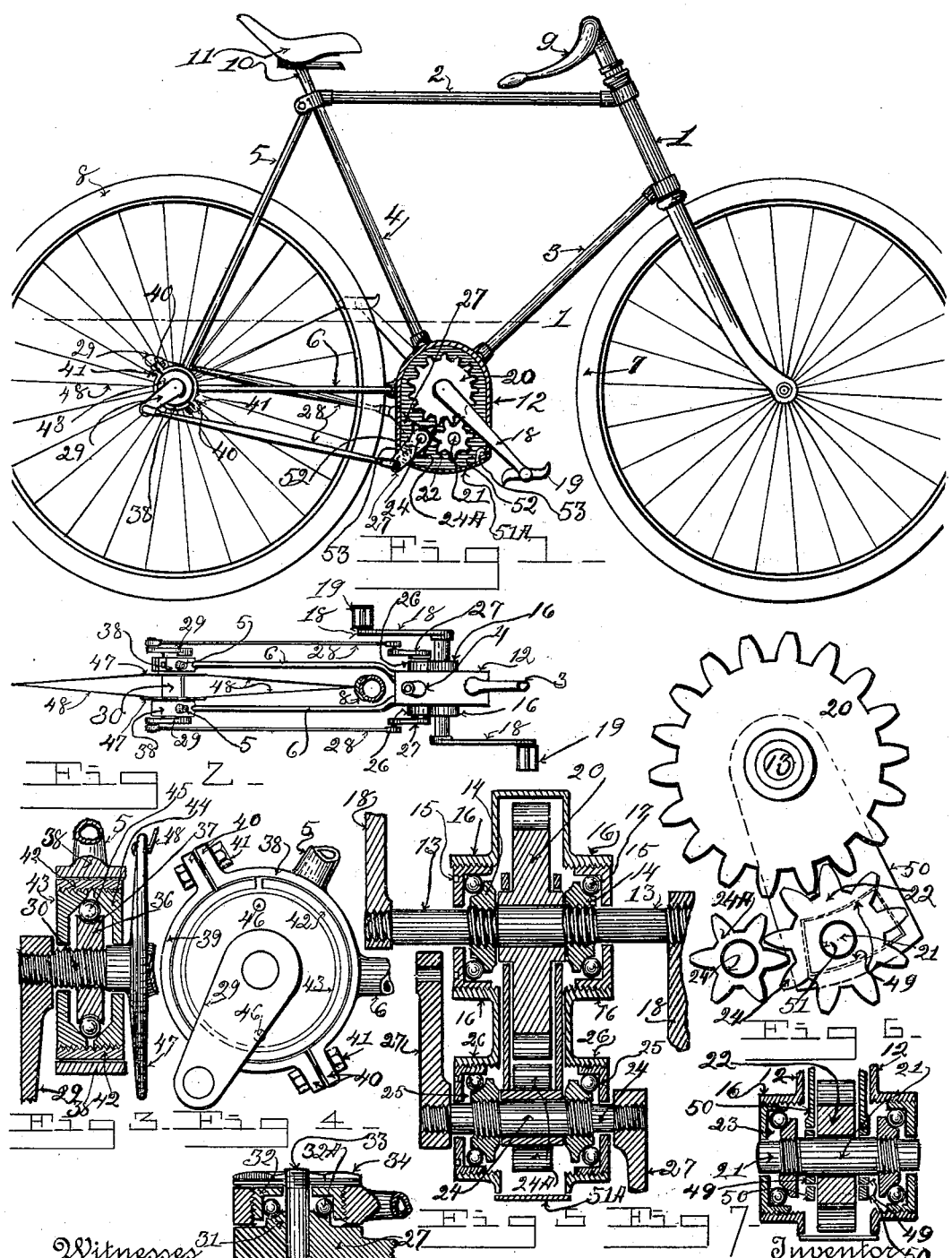
No. 619,421. Patented Feb. 14, 1899.
G. JOHNSON.
BICYCLE DRIVING MECHANISM.
(Application filed July 26, 1898.)
(No Model.)

GUSTAF JOHNSON, OF DENVER, COLORADO.

BICYCLE DRIVING MECHANISM.

SPECIFICATION forming part of Letters Patent No. 619,421, dated February 14, 1899.

Application filed July 26, 1898. Serial No. 686,955. (No model.)

*To all whom it may concern:*

Be it known that I, GUSTAF JOHNSON, a citizen of the United States of America, residing at Denver, in the county of Arapahoe and State of Colorado, have invented certain new and useful Improvements in Bicycle Driving Mechanism; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in driving mechanism for bicycles; and the objects of my invention are, first, to provide an easy-running, simple, and inexpensive driving-gear, and, second, to provide a bicycle driving mechanism that will run much easier than many in use. I attain these objects by the mechanism illustrated in the accompanying drawings, in which—

Figure 1 is a side elevation of a bicycle embodying my invention, with a section through the gear-casing. Fig. 2 is a plan view of Fig. 1 on line 1. Fig. 3 is a section through one end of the rear-wheel axle. Fig. 4 is a side elevation of the end of the rear-wheel axle. Fig. 5 is a section through the pedal crank-axle and the gear of my driving mechanism. Fig. 6 is a side elevation of the driving-gears of my bicycle driving mechanism. Fig. 7 is a fragment showing a section through the intermediate pinion of the train of gears I employ as a part of my driving mechanism; and Fig. 8 is a fragment in section of one end of a connecting-rod and the coöperating end of a crank, showing a ball-bearing between the two.

Similar numerals of reference refer to similar parts throughout the several views.

Referring to Fig. 1, which represents a side view of a bicycle embodying my invention, the numeral 1 designates the steering-head; 2, the top tube; 3, the lower front tube; 4, the saddle-post tube; 5, the rear-fork tubes; 6, the rear side tubes; 7, the front wheel; 8, the rear wheel; 9, the handle-bars; 10, the saddle-post, and 11 the saddle. The lower front tube, the saddle-post tube, and rear side tubes diverge from a casing 12, which surrounds the crank-axle 13 and incases the gears of my driving mechanism. The crank-axle 13 extends through the casing and is supported by suitable ball-bearings. The ball-bearings consist of the cones 14, which are threaded to the axle, the cups 15, which are threaded to a boss 16, that projects from opposite sides of the casing, and a circular row of balls 17, operatively positioned between the cups and cones. The axle extends beyond each side of the casing, and to its ends are secured pedal-cranks 18, which support pedals 19. In the center of the axle, between the cones, I secure a driving-gear 20. Below this driving-gear I mount upon an axle 21 a pinion 22, which meshes with the driving-gear. The axle 21 is preferably journaled on suitable ball-bearings 23, although a plain circular bearing may be used, if desired. These ball-bearings consist of cups, cones, and balls constructed and arranged similar to those on the axle 13. At the side of the pinion 22 I journal in the sides of the casing an axle 24, which is also mounted on ball-bearings 25, preferably similar to those on the axles 13 and 21, and on the axle 24 I secure a pinion 24$^A$, which meshes with the intermediate pinion 22 and is driven by it. The ends of the axle 24 project beyond the bosses 26 formed on the casing, and to its ends I secure in any suitable manner cranks 27, to which are connected connecting-rods or pitmen 28, one being arranged on each side of the rear wheel. These connecting-rods extend from the cranks 27 to cranks 29, which are threadedly secured to the axle 30 of the rear wheel. The cranks are preferably set at the quarter-points of their circle of revolution relative to each other. A ball-bearing is also preferably provided between the cranks and the ends of the connecting-rods. As illustrated in Fig. 8, this ball-bearing comprises cone 31, formed on the side of the crank, a cup 32, that is threaded to the end of the connecting-rod, and a row of balls 32$^A$ between the cup and cone. A pin 33 projects from the center of the cone, to the end of which a nut 34 is threaded, which is adapted to secure the connecting-rod and crank and ball-bearing operatively together. The axle of the rear wheel is also provided with ball-bearings, and in order to provide a suitable ball-bearing that can be quickly and easily adjusted without removing the cranks I preferably arrange the ends of the rear-fork tubes and the ball-bearings as follows: A cone 35 is threaded to the axle, which consists of a disk 36, provided with a peripheral groove 37. The ends of the rear forks are formed with a round loop 38, which is divided to form a strap portion 39 of one-half of the loop. Both halves of the loop are provided with oppositely-disposed flanges 40. I place bolts 41 through the flanges and arrange them to clamp the two halves of the loop together. A split ring 42 is fitted inside of the loop, the inner periphery of which is threaded. Two cups 43 and 44 are threaded to the ring and are arranged to face each other and to bear on opposite sides of a row of balls 45, which are placed around the cone. After the cups are adjusted by screwing them up against the balls they are locked in position by tightening the bolts in the flanges of the loop, which compresses and clamps the ring around the cups. Pin-holes 46 are made in the side surface of the cup 43, in which pins or a suitable wrench may be inserted to turn the cups. The other cup rarely has to be readjusted.

47 designates the flange of the rear axle, to which the spokes 48 are attached.

In order to provide different gear-speeds, I increase or diminish the size of the connecting-rod-crank-driving pinion. In order to accomplish this, it is necessary to move the intermediate pinion so that it will still be in operative mesh with both the driving-gear and with the size of crank-driving pinion used. This feature of my invention can be carried out in several ways. Where a ball-bearing is used for the axle to run in, a slot can be cut in the sides of the casing, into which interchangeable blocks can be fitted similar to the blocks 49, (shown in Fig. 6,) which should be adapted to carry the ball-bearing and axle. In Fig. 6 the axle simply rotates in blocks 48, which are fitted into an aperture 49 formed in yoke-pieces 50, which surround hubs formed on the driving-gear. The blocks are provided with holes 51 for bearings for the axle. These holes are placed in the blocks in position which will move the intermediate pinion and its axle either toward or away from the crank-driving pinion, which enables a larger or smaller pinion to be used. Consequently if several sets of blocks are provided and each set has the axle-bearing hole placed to allow some particular-sized crank-driving pinion to mesh properly with the intermediate pinion several gear speeds can be obtained by changing from one to another, and these changes in speed can be made by a rider in a few minutes whenever desired. The casing is provided with a movable bottom 51$^A$, which is provided at each of its four corners with lugs 52, that extend up against the sides of the casing. Through these lugs and the sides of the casing bolts 53 are screwed, which secure the bottom to the casing. The gearing is all put in place, and any changes made in it are made through this bottom-opening. If preferred, however, the bottom can be made integral with one side and top of the casing, and one side can be arranged to be removably secured to the edges of the casing.

The operation of my improved bicycle driving-gear is as follows: The crank-pedals are rotated by a rider, which rotates the driving-gear. This gear rotates the intermediate pinion, which drives the crank-pinion and rotates the pinion-cranks and connecting-rods. The connecting-rods rotate the cranks on the rear-wheel axle, and consequently the rear wheel of the bicycle. My improved driving-gear is very simple, compact, and durable. The gears are well protected from dust by the casing, which is of small size and neat in appearance, and they can easily be kept well lubricated by any suitably-arranged oil-hole.

Having described my invention, what I claim as new, and desire to secure by Letters Patent, is—

The combination in a bicycle driving-gear of the train of three gears, the cranks and the connecting-rods, with the casing inclosing said train of gears and the ends of the rear-fork tubes having cylindrical loops formed thereon, divided into two parts and flanged to be clamped together; means for clamping said parts together; a split ring fitting in said looped ends, the rear-wheel axle, a cone mounted on said axle, a row of balls around said cone, and two cups threaded to the inside of said split ring and arranged on opposite sides of said cone in operative bearing relation to said row of balls, and means for adjusting said cups substantially as described.

In testimony whereof I affix my signature in presence of two witnesses.

GUSTAF JOHNSON.

Witnesses:
 WM. O. PERRY,
 JOHN H. PERRY.